Oct. 25, 1932.　　　F. M. SLOUGH　　　1,885,053

ELECTRIC CONTROL SYSTEM AND APPARATUS

Filed Dec. 27, 1930

INVENTOR.

Frank M. Slough

BY

Slough and Canfield

ATTORNEY.

Patented Oct. 25, 1932

1,885,053

UNITED STATES PATENT OFFICE

FRANK M. SLOUGH, OF LAKEWOOD, OHIO, ASSIGNOR TO THE ANDERSON COMPANY, OF GARY, INDIANA, A CORPORATION OF INDIANA

ELECTRIC CONTROL SYSTEM AND APPARATUS

Application filed December 27, 1930. Serial No. 505,187.

This invention relates to electric control systems and apparatus and particularly to systems and apparatus in which an apparatus controlling element may be caused to take up various controlling positions in a range of movement in response to changes of a variable factor, such as pressure, temperature, velocity or the like at a point situated remotely from the apparatus.

My invention is applicable to numerous uses, but I have chosen to illustrate and describe it herein as applied to the control of the heat output of a heat supplying apparatus such as a furnace in which the output of heat is controlled by varying the rate of combustion in the furnace, or by varying the rate of flow of fuel such as oil or gas to the furnace; or a heat supplying apparatus such as a radiator, the control of which is effected by varying the flow of steam, hot water or other heat medium to the radiator.

It is one of the objects of this invention to provide an improved electric control system and apparatus in which an element of an apparatus to be controlled may be caused to take up various positions within a range of movement in response to changes of the variable factor such as temperature, pressure, velocity or the like at a point situated remotely from the apparatus.

Another object is to provide such a system and apparatus in which the movable element of the apparatus takes up various positions in accordance with and in response to variations of electrical energy transmitted to the apparatus.

Another object is to provide such a system and apparatus in which the variations of electrical energy may be transmitted to the apparatus in impulses of varying duration from a remotely situated controller and in an improved manner.

Another object is to provide such a system and apparatus in which the movable element of the apparatus to be controlled may be moved by an electro-dynamic power supplying means operated in an improved manner.

Another object is to provide such a system and apparatus in which the electro-dynamic means is of the solenoid magnet type.

Another object is to provide an electric control system and apparatus for controlling the supply of heat to a room or rooms of a building to maintain the same at substantially a constant temperature, and in which the supply of heat to the room may be varied in accordance with the position of a heat apparatus controlling element within a range of movement thereof, the position which the movable element takes up varying in accordance with variations of temperature of the room to be heated and the movement of the movable element from one position to another be effected by an electro-dynamic power supplying means variably energized by electric current, the variations of which are responsive to variations of temperature of the room to be heated.

Other objects will be apparent to those skilled in the art to which my invention pertains.

My invention is fully disclosed in the following description taken in connection with the accompanying drawing in which.

Figures 1, 2, 3:
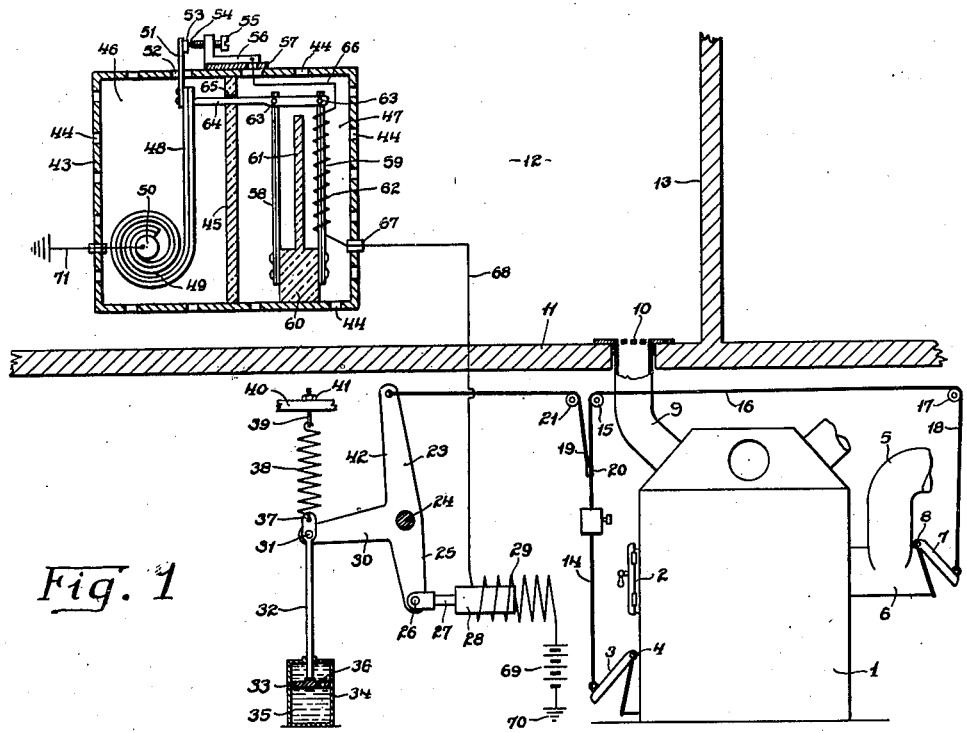
Fig. 1 is a diagrammatic view illustrating a heat supplying furnace of the hot-air type, and in connection therewith, an embodiment of my invention for controlling the heat output of the furnace.
Fig. 2 is a view similar to a part of Fig. 1, showing another modification.
Fig. 3 is a view similar to a part of Fig. 1 showing another application of my invention.

Referring to the drawing, I have shown at 1 in simplified form a furnace of the hot-air type having a fuel door through which the fuel may be supplied to the furnace. At 3 is represented a draft door hinged to the frame of the furnace as at 4 for varying the supply of air to the furnace to vary the rate of combustion of the fuel therein. At 5 is a smoke pipe having a horizontal portion 6 extending beyond the pipe proper 5 and provided with a check draft door 7, hinged at 8, and adapted to be opened and closed to effect a variation of the rate of combustion in the furnace in cooperation with the draft door 3 in a well known manner.

At 9 is one of a plurality of hot air supplying pipes communicating with a register 10 in the floor 11 of a room 12 to be heated only one wall 13 of which is indicated in the drawing.

To operate the draft and check doors 3 and 7 respectively, a chain 14 is connected to the door 3, passes over an overhead pulley 15, extends horizontally as at 16 and over another pulley 17 and downwardly as at 18 to the check door 7. Another chain 19 is connected to the chain 14 below the pulley 15 as at 20, passes upwardly over a pulley and thence horizontally and is connected as at 22 to one arm of a three-armed bell crank lever 23, mounted to rock on a shaft 24.

Another arm 25 of the lever has pivoted to its outer end as at 26 a plunger rod 27 connected to the plunger 28 of a solenoid magnet, the electric winding of which is indicated at 29.

Another arm 30 of the lever has pivoted thereto as at 31 the upper end of a dash-pot piston rod 32 on the lower end of which is a piston 33 reciprocable in a cylinder 34, substantially filled with liquid, such as mercury or oil 35, the piston 33 having an escapement valve port 36 therein.

Preferably aligned with the piston rod 32 and connected either to the lever arm 30 or to an extension 37 of the piston rod 32 is a tension spring 38, the other end of which is connected to an adjusting bolt 39 extending through a suitable perforation in a stationary support 40, and provided with a nut 41 for adjusting the tension of the spring 38.

With the arrangement thus far described, when the solenoid winding 29 is energized, the plunger 28 will be drawn thereinto and will rock the lever indicated generally at 42 in a counter-clockwise direction around the shaft 24. This movement will be communicated to the chains 19 and 14 and will open the draft door 3 and correspondingly close the check door 7 to increase the combustion of the furnace. For any different amount of electrical energy supplied to the winding 29, a corresponding force will be exerted on the plunger 28, and this will be opposed by the spring 38. As the plunger 28 moves into the winding 29, the spring 38 is elongated and the opposing force exerted thereby increases until equilibrium is reached, the plunger 29 assuming a definite position.

As will presently be described, in the preferred practice of my invention, the energy supplied to the winding 29 is supplied thereto in current impulses of varying duration. For impulses of any given duration, a definite amount of energy will be supplied to the winding 29. To prevent the plunger 28 from reciprocating in the winding 29, due to the concurrent action of the magnetic pull of the winding and the counter-pull of the spring 38, the dash-pot arrangement above described is provided, any tendency of the lever 42 to move being retarded by escapement of the liquid 35 in the cylinder 34 through the port or escapement valve 36 from one side of the piston therein to the other.

Thus with current impulses flowing through the winding 29, if the duration of the impulses is increased, the average pull of the impulses on the plunger 28 will be increased, the plunger 28 will slowly move into the winding 29 under the control of the dash-pot device and until the magnetic pull is exactly equalled and counter-balanced by the incresing pull of the spring 38, whereupon the plunger 28 will stop moving, take up a definite position, and as will now be understood, this position will effect a corresponding definite position of the doors 3 and 7 within their range of movement and between the extreme possible limits of their movement.

The solenoid including the plunger 28 and winding 29 may, as will be understood, be designed and proportioned to move the doors 3 and 7 from their full open to full closed position on a complete stroke of the plunger 28.

The means for transmitting current impulses through the winding 29 will now be described.

Disposed in the room 12 to be heated, is an electric controller comprising a casing 43 provided with perforations 44—44 in the walls thereof whereby, by circulation of air therethrough, the interior of the casing 43 may at all times be substantially at the temperature of the room 12. The casing is preferably divided by a non-heat-conducting partition 45, thus providing a chamber 46 and a chamber 47. In the chamber 46 is a bimetallic thermostat 48 responsive to temperature of the room 12. The thermostat 48 may be of any suitable construction, but I prefer to employ a relatively heavy and long bimetallic element coiled as at 49 and secured to the casing 43 as by a post 50 to which one end of the element is secured. The element 48 is disposed in the chamber 46 and the free end thereof projects upwardly and has secured thereto a contact arm 51 projecting outwardly through an aperture 52 in the top wall of the casing and bearing a contact 53. The contact 53 is adapted to cooperate with a contact 54 on the end of an adjusting screw 55 threaded in a bracket 56 mounted upon the top wall of the casing and electrically insulated therefrom by an insulator 57.

In the chamber 47 is a pair of bimetallic thermostatic elements 58 and 59 respectively, disposed substantially parallel and mounted at one end as, for example, at their lower ends upon a heat insulating support 60 secured to the casing and provided with a heat insulating tongue or partition 61 disposed between the elements 58 and 59 for a purpose to be described. The element 59 has associated therewith an electric winding or other electric heater 62. The upper or free ends of the elements 58 and 59 are connected as by pivots 63—63 to a generally horizontally disposed bar 64 extending through an aperture 65 in the partition 45, and at its end abutting upon the element 48 at a point generally near the free end of the same.

The winding 62 is connected by a wire 66 to the bracket 56, being projected through suitable perforations in the top wall of the casing and in the insulator 57. The other terminal of the winding 62 passes through the wall of the casing through an insulator 67 and is connected by a wire 68 to the solenoid winding 29, the other terminal of the winding 29 being connected to one side of a current supply source, such as a battery 69, which is also grounded as at 70. The post 50 on which the element 48 is mounted is grounded as at 71.

In operation of the controller above described, if the temperature of the room 12 falls below a predetermined regulating temperature, such as 72° Fahrenheit, the element 48 will thereupon move responsively toward the right, Fig. 1, and move the contact 53 into engagement with the contact 54. Thereupon, current will flow from the battery 69 through the winding 29, heater 62, contact 54—53, returning to the battery by the ground 71—70. The winding 62 will heat the element 59, causing it to bend toward the left, Fig. 1, and to exert a thrust by the bar 64 on the element 48, bending it to the left and breaking contact at 53—54. Thus an impulse of current is sent to the winding 29. Thereupon, the winding 62 cools off by radiation and by conduction and convection of air in the chamber 47, permitting the element 59 to return to its original position, and permitting the element 48 to also return toward the right in Fig. 1 and again close the contact 53—54 sending another current impulse to the winding 29. This action continues, sending a succession of impulses to the winding 29.

If the temperature of the room 12 falls still farther, the element 48 will tend to move farther to the right and therefore will require greater force to be applied to it by the element 59 before it will break the contact 53—54. A greater quantity of heat will therefore be required in the element 59 to effect the breaking of the contact, and to supply this heat, current must flow in the winding 62 for a longer period of time. Thus, for a slightly lower room temperature, the duration of the impulses will be greater. Similarly, but conversely, if the room temperature rises, the element 48 will tend to move to the left and impulses of shorter duration will be sufficient to break the contact 53—54, and hence impulses of shorter duration will flow to the winding 29.

As described above, a change of impulse duration will effect a change of position of the solenoid plunger 28 and correspondingly of the doors 3 and 7. Therefore, a change of room temperature will effect this change in position through the change of duration of the impulses as just described.

Therefore, a change of temperature of the room 12 will effect a corresponding change of position of the doors 3 and 7 of the furnace, to increase the rate of combustion on a fall of temperature and to reduce it on a rise of temperature. Also, as a result of this mode of regulation, the doors 3 and 7 will tend to take up a definite position at which, at all times, the temperature in the room 12 will be maintained substantially constant at a predetermined value, such as 72°. For example, if the outside temperature is low, the draft door 3 will take up a position in the full open direction, and if the outside temperature is high, the draft door 3 will take up a correspondingly more nearly closed position.

The temperature tolerance, or in other words, the permissible increase or decrease, above or below, the desired predetermined temperature of the room 12, may be made as small as desired by providing suitable sensitiveness in the element 48, as will be understood.

By providing the partition 45 in the casing 43, the element 48 will be shielded from temperature in the chamber 47, which will be higher due to the heating winding 62 being disposed therein, and thus the element 48 will be responsive to room temperature only.

By providing two elements 58 and 59 connected as described, and by mounting the element 58 so that it tends to bend in a direction opposite to the bending direction of the element 59, the element 58 will compensate the element 59 for changes of temperature in the chamber 47 occasioned by change of room temperature communicated thereto. Thus, the element 59 will be permitted to respond to heat from the element 62 only. The partition 61 between the two elements shields the element 58 from heat produced by the winding 62, so that the element 58 will be free to respond to changes of room temperature only.

It is believed to be obvious that when the temperature of the room 12 falls slightly to effect an increase of rate of combustion in the furnace 1, the heat supplied to the room 12 through the register 10 will be increased to restore the temperature of the room 12 to the desired value and to effect a reduction in the rate of combustion, if necessary, to prevent the room temperature from rising above the desired value. Thus a change of temperature of the room 12 effects functioning of the controller in the room and a functioning of the furnace 1 to overcome the change of temperature of the room.

The size and proportion of the parts of the controller in the room 12 and of the furnace regulating apparatus has been distorted in the drawing in order to make the construction of these parts clear, and the size and proportions of the furnace 1 have been distorted to reduce the scale thereof.

In the form of my invention shown in Fig. 2, the construction is similar to that in Fig. 1 except that a different mode of compensating for changes of room temperature in the chamber 47 is provided.

Two bimetallic thermostatic elements are provided, an element 75 provided with a heating winding 76 and an element 77. The two elements 75 and 77 are disposed in longitudinal alignment and are connected together by a heat-insulating element 78, and the element 75 is mounted on a heating-insulating base 79 on the casing wall. The free end of the element 77 has connected thereto a bar 80 which abuts upon the thermostatic element 48 extending through a perforation 81 in the wall 45. Heating of the element 75, tends to move its upper or free end toward the left, as viewed in the drawing, and heating of the element 77 tends to move its upper or free end toward the right. Thus, changes of temperature in the chamber 47 due to changes of room temperature and which tend to move the element 75, are compensated for by movement of the element 77, and movement of the bar is therefore effected only by changes of temperature of the element 75 effected by heat from the winding 76.

In the modification of my invention shown in Fig. 3, the lever 42 is connected to the movable operating element 85 of a valve 86 by a connecting rod 87. The valve 86 controls the flow of fluid through a fluid conduit 88.

The conduit 88 may be a steam line conducting steam to a radiator in the room 12, and the supply of steam to the conduit 88 may be controlled by controlling the position of the operating element 85 which, in turn, is moved to take up various definite positions within its range of movement by the solenoid 29 and plunger 28 in response to impulses of current transmitted thereto from a controller in the room 12 like or similar to that described in connection with Fig. 1.

Again, the conduit 88 may be a fuel supply conduit for oil or gas conducted therethrough to a furnace similar to that indicated at 1 in Fig. 1. In such a case, the rate of combustion in the furnace may be controlled by positions of the element 85 to supply fuel at a greater or lesser rate and thus to control the rate of combustion similarly to the rate of combustion control effected by the positions of doors 3 and 7 in Fig. 1.

My invention is not limited to the exact details of construction shown and described hereinbefore. Many changes in and modifications of my invention may be made within the spirit and scope thereof without sacrificing its advantages.

I claim:—

1. In a heating system, the combination with a source of heat and regulator for regulating the amount of heat delivered from said source to a space to be heated, electro-responsive means for adjustably effecting the operation of said regulator, an electrical controller disposed in the space to be heated controlling said electro-responsive means, said controller comprising a pair of thermostats, one of said thermostats having a portion movable responsive to changes of temperature in the air surrounding it, an electrical current flow controller operable by said thermostat movable portion, the second of said thermostats having two oppositely movable thermally responsive portions, an electric heating element so disposed that when energized it will principally communicate heat to one only of said portions of said second thermostat means movable under the joint control of both of said portions of said second thermostat adapted to oppose the operative effect of said first thermostat on said electrical controller, a source of electric current for energizing said electrical heating element and said electro-responsive means, electric circuit conductors, interconnecting said source, said controller, said electrical heating element, electro-responsive means, said controller controlling the flow of current from said source to said electrical heating element and said electro-responsive means.

2. The heating system substantially as claimed in claim 1, characterized by the provision of means associated with said regulator and said electro-responsive means, to damp quick movements of said regulator, otherwise effected thereupon by said electro-responsive means.

3. The heating system substantially as claimed in claim 1, characterized by said electro-responsive means comprising an electro-magnet operable by current from said source flowing therethrough under the control of said controller, and means to restrain rapid movements of said regulator otherwise effected thereupon by said electro-responsive means.

4. An electrical system, a thermostat responsive to the temperature of ambient air, an electrical current flow controller operable by said thermostat, electro-thermal means for reducing the operative effect of said thermostat upon said controller including an electrical heating element, an electro-magnetic motor mechanism disposed remotely to said controller and comprising an electro-magnetic winding and portion movable responsive to current flows through the winding, a source of current for energizing said motor mechanism and said heating element, electrical circuit conductors, said controller controlling the flow of current through said conductors to both said electrical heating element and said motor mechanism, said movable portion of said mechanism being restrained from rapid movements responsive to rapid fluctuations in the strength of electrical current flowing through its said winding, and adapted to move commensurable to the time integrated value of the current impulses directed through said winding.

5. In a heating system, the combination of an electrical system comprising a thermostat current flow controller operable by said thermostat, electro-thermal means for reducing the operative effect of said thermostat upon said controller including an electrical heating element, an electro-magnetic motor mechanism disposed remotely to said controller and comprising an electro-magnetic winding and portion movable responsive to current flows through the winding, a source of current for energizing said motor mechanism and said heating element, electrical circuit conductors, said controller controlling the flow of current through said conductors to both said electrical heating element and said motor mechanism, said movable portion of said mechanism being restrained from rapid movements responsive to rapid fluctuations in the strength of electrical current flowing through its said winding, and adapted to move according to the time integrated value of the current impulses directed through said winding, in combination with a source of heat for supplying heat to the space whereat said thermostat is located, and a regulator for said source of heat adapted to be adjustably moved by the said movable portion of said motor mechanism.

6. The heating system substantially as claimed in claim 1, characterized by the two relatively compensating portions of said second thermostat being secured together end to end, one of said portions supporting the other portion.

7. The heating system substantially as claimed in claim 5 characterized by the electro-thermal means comprising a pair of oppositely operable relatively compensating thermostatic portions with an electrical heating element so disposed as to communicate heat mostly to one of said portions, and an element movable by the conjoint thermally responsive effect of both of said thermostat portions, to modify the effect of said first named thermostat upon the controller.

8. The heating system substantially as defined in claim 1, characterized by said electro-responsive means comprising an electro-magnet operable by current from said source flowing therethrough under the control of said controller, and dash-pot means to restrain rapid movements of said regulator, otherwise effected thereupon by said electro-responsive means.

9. The heating system substantially as claimed in claim 1, characterized by the two relatively compensating portions of said second thermostat, being disposed in tandem relation and their corresponding ends connected together.

10. An electrical system, a thermostat responsive to the temperature of ambient air, an electrical current flow controller operable by said thermostat, electro-thermal means for reducing the operative effect of said thermostat upon said controller including an electrical heating element, an electro-magnetic motor mechanism disposed remotely to said controller and comprising an electro-magnetic winding and portion movable responsive to current flows through the winding, a source of heat for supplying heat to the space whereat said thermostat is located, and means for said source of heat adapted to be adjusted to vary the amount of heat delivered from said source to said space, and means including an inertia element associated with said last named means to prevent rapid changes in any adjusted condition of the aforesaid last named means, a source of current for energizing said motor mechanism and said heating element, electrical circuit conductors, said controller controlling the flow of current through said conductors to both said electrical heating element and said motor mechanism, said movable portion of said mechanism adapted to move commensurable to the time integrated value of the current impulses directed through said winding.

11. An electrical system, a thermostat responsive to the temperature of ambient air, an electrical current flow controller operable by said thermostat, electro-thermal means for reducing the operative effect of said thermostat upon said controller including an electrical heating element, an electro-magnetic motor mechanism disposed remotely to said controller and comprising an electro-magnetic winding and portion movable responsive to current flows through the winding, a source of heat for supplying heat to the space whereat said thermostat is located, and means for said source of heat adapted to be adjusted to vary the amount of heat delivered from said source to said space, a source of current for energizing said motor mechanism and said heating element, electrical circuit conductors, said controller controlling the flow of current through said conductors to both said electrical heating element and said motor mechanism, said movable portion of said mechanism adapted to move commensurable to the time integrated value of the current impulses directed through said winding, and because of its inertia being substantially inoperable to respond to individual of said current impulses.

12. A temperature control system comprising electrical current source means, electrical circuit conductors, a current flow controller comprising a pair of make and break contacts, a pair of relatively remotely disposed electro-responsive mechanisms, a controlling one of the mechanisms being electro-thermally operable and the other being electro-magnetically operable, each disposed so as to be traversed by substantially concurrent relatively commensurable energizing flows of current supplied from said source over said conductors under the common control of said controller contacts, the controlling mechanism being responsive to the heating effects of current from said source through said controller to actuate the controller contacts to break the current flow through both mechanisms and at the same time affected by the temperature effects of ambient fluid such as air, water or the like to which it is exposed to modify the effect of the electrical heating thereupon whereby varying amounts of electrical heating will be required to effect breaking of the contacts by the controlling mechanism, according to the varying temperatures of said ambient fluid, said controller contacts thereby being operable under the joint thermal effects of the current flowing therethrough, and the thermal effects of the ambient fluid to intermittently supply impulses of electrical heating current to said mechanism the length of the impulses varying according to the varying temperatures of said ambient fluid, said contacts, at the same time, similarly modifying the impulses of current to the other of said mechanisms, said other mechanism comprising electro-magnetic energizing means and an element movable, according to the integrated values of current flow impulses supplied to the said electromagnetic means under the control of said controller, to any of a plurality of relatively progressively advanced positions corresponding to departures of the temperature of said ambient fluid from a datum temperature, said movable element for the controlled mechanism, however, having such properties of inertia to such a degree as to cause it to be substantially inoperable to substantially concurrently respond to individual current impulses caused by said controller contacts, directed through the electro-magnetic means of its associated mechanism.

In testimony whereof I hereunto affix my signature this 24th day of December, 1930.

FRANK M. SLOUGH.